US005336410A

United States Patent [19]

O'Brien et al.

[11] Patent Number: 5,336,410

[45] Date of Patent: Aug. 9, 1994

[54] THREE CHAMBER VESSEL FOR HYDROCYCLONE SEPARATOR

[75] Inventors: Kevin J. O'Brien, Houston, Tex.; Pete A. Thompson, Gloucester, England; Stephen T. McCoy, Missouri City, Tex.

[73] Assignee: Conoco Specialty Products Inc., Houston, Tex.

[21] Appl. No.: 739,283

[22] Filed: Aug. 1, 1991

[51] Int. Cl.[5] .......................... B01D 21/26; B04C 5/28; B04C 5/12

[52] U.S. Cl. .......................... 210/512.1; 210/512.2; 55/459.1; 209/728; 209/732; 209/734

[58] Field of Search .......................... 210/512.1, 512.2; 209/144, 211; 55/459.1

[56] References Cited

U.S. PATENT DOCUMENTS

| | | | |
|---|---|---|---|
| 2,622,735 | 12/1952 | Criner | 209/211 |
| 2,765,918 | 10/1956 | Fontein et al. | 210/512.2 |
| 3,371,794 | 3/1968 | Johnson | 210/512.2 |
| 3,543,931 | 12/1970 | Rastatter | 209/211 |
| 4,208,270 | 6/1980 | Grieve et al. | 209/211 |
| 4,585,466 | 4/1986 | Syred et al. | 55/349 |
| 4,650,584 | 3/1987 | Macierewicz | 210/512.2 |
| 5,009,785 | 4/1991 | Webb | 210/512.2 |

OTHER PUBLICATIONS

International Publication No. WO89/11339.
International Publication No. WO89/02312.

*Primary Examiner*—Robert A. Dawson
*Assistant Examiner*—David Reifsnyder
*Attorney, Agent, or Firm*—David W. Westphal

[57] ABSTRACT

The present invention relates to a hydrocyclone apparatus which is simple in design, more space efficient, and easier to maintain than prior art designs. The invention comprises a three chamber vessel wherein the inlet chamber is between the outlet and overflow chambers. Therefore, the inlets to the liners are between the plates dividing the vessel into separate chambers and the outlets from the liners extend directly into the end chambers the labyrinth of passages and conduits for the overflow liquid. The present invention includes a no bolt securing arrangement for securing the liners in the vessel. In particular, the liner includes a shoulder portion which abuts one of the dividing plates and an end cap which closes the open end of the vessel being in close proximity to the ends of the liners thereby securing the liners in the opening in the dividing plates. The shoulder further includes lobes to limit rotation of the shoulders. The present invention further includes a new arrangement for providing an inlet for the liner. The inlet is formed into an inlet block which is made out of a different material than the rest of the liner for abrasion resistance and is inserted into the liner through a breech opening in the side of thereof. The breech loaded inlet block is secured by a overflow plug which screws into the header end of the liner.

28 Claims, 7 Drawing Sheets

THREE CHAMBER VESSEL FOR HYDROCYCLONE SEPARATOR

FIELD OF THE INVENTION

This invention relates to hydrocyclones for separating a fluid mixture into separate liquid constituents by density, and more particularly to the design, manufacture and assembly of the hydrocyclone vessel and the liners within the vessel.

BACKGROUND OF THE INVENTION

Hydrocyclones have been used for a number of years in offshore petroleum platforms for separating oil and other residue from water so that the water is clean and environmentally suitable for discharging into the sea and the oil may be directed to a suitable transport for shipping to a refinery. Such hydrocyclones are used for separating fluid mixtures having a wide range of oil/water proportions. Some hydrocyclones are designed to separate oil from water, others are designed to separate water from oil, and there are still others that are designed to separate mixtures of generally equal proportions. The latter hydrocyclones are sometimes referred to as pre-separation hydrocyclones since the outlet streams are often directed to dewatering and de-oiling hydrocyclones as is known. With the space limitations and weight carrying capacity of an offshore platform, weight and size of most equipment is carefully scrutinized. Accordingly, there has been a lot of developmental work on improving the efficiency of the hydrocyclone operation so that the oil outlet stream includes minimal water content and the water outlet stream includes minimal oil content. As the hydrocyclones have further developed in both complexity and capacity, the vessels in which they operate have become bigger to handle the equipment and additional liners used to separate the liquid constituents.

Referring to FIG. 1, there is shown a simplified prior art design of a hydrocyclone generally indicated by the number 10. The prior art design includes a vessel 20 having a liquid mixture inlet port 21 generally at one end and a water outlet port 22 generally at the other end. Within the vessel 20, there is a mounting plate 25 having a plurality of openings through each of which a liner 30 may be inserted and mounted. The plate 25 divides the vessel into an inlet chamber 26 and a water outlet chamber 27. As may be more clearly understood from FIG. 2, the plate 25 is comprised of two plate halves 25A and 25B which define a plenum for the receipt and collection of oily water. The oily water is discharged from the vessel through a conduit 25C which leads to a oil outlet port 23 at the side of the vessel 20. As can be more clearly seen in FIG. 2, the liner 30 comprises a number of elements that are assembled at the vessel 20. The liner 30 comprises an elongate tube 31 having a reducing inner diameter, an involute inlet head 32 connected to the larger diameter end of the elongate tube 31 for admitting the liquid mixture into the liner 30 and directing it into a swirling motion, and an overflow gallery 33 for collecting the overflow fluid exiting through the axial port in the involute inlet head and directing the overflow fluid though the passage indicated at 35 to the interconnected plenums in the plate 25. The elements 31, 32 and 33 are stacked and held together by bolts 37 which are attached to the plate 25 by screw threads. To assemble a number of liners 30 in a vessel requires significant manual labor holding each of the elements in position to insert a bolt down through the stack, threading and tightening the bolts. In the adverse conditions of an offshore platform, maintaining the vessel may be quite difficult and time consuming as well as a safety hazard for maintenance personnel.

Additionally, the combination of the bolts and the overflow gallery add significantly to the dimension of the liners. As noted above, platform space is critical and any waste of space will not be tolerated. The capacity of the hydrocyclone apparatus is determined by the size and number of the liners. With the space taken by the return line in the overflow gallery, and the space used by bolts prevents using any additional interior vessel space for adding to the capacity of the vessel 20.

Accordingly, it is an object of the present invention to provide a hydrocyclone apparatus which overcomes the drawbacks and disadvantages of the prior art as discussed above.

It is a more particular object of the present invention to provide a hydrocyclone apparatus which has greater fluid separation efficiency in the smallest possible package.

It is a further object of the present invention to provide a hydrocyclone apparatus which is less complex than prior art hydrocyclone devices and is more easily serviced by maintenance personnel.

SUMMARY OF THE INVENTION

The above and other objects of the invention are achieved by the provision of a hydrocyclone apparatus comprised of a generally cylindrical hollow pressure vessel having two spaced apart dividing plates disposed generally transversely within the vessel to divide the vessel into a medial inlet chamber and two end discharge chambers. At least one longitudinally extensive hollow liner is disposed through openings in each of the dividing plates wherein the liners each have a fluid inlet along a peripheral portion thereof spaced inwardly from the ends thereof and outlets adjacent its opposite ends. Seals are provided for sealing the portion of the openings around the periphery of the liner in each of the dividing plates so that the chambers are sealingly isolated from one another except through the liner.

The invention is also directed to a hydrocyclone apparatus comprised of a generally cylindrical hollow pressure vessel having a first open end, a second opposite closed end, and an end cap for closing the first open end. At least one dividing plate is spaced inwardly from the first open end of the vessel between the first open end and the second end wherein the dividing plate is disposed generally transversely within the vessel to define separate chambers therein. A plurality of longitudinally extensive hollow liners each having a header end, an opposite tail end, a fluid inlet along a peripheral portion thereof spaced inwardly from the ends thereof, an underflow outlet adjacent the tail end and an overflow outlet adjacent the header end are disposed through openings in the dividing plate so that the tail end of each the liner is within one chamber and the underflow outlet is within another chamber. Seals are provided for sealing the portion of each opening around the periphery of each liner in the dividing plate so that the chambers are sealingly isolated from one another except through the liner. An engagement device is provided on the header end of each of the liners to engage one another to prevent rotation of the liners which would otherwise be rotatable within the openings.

The invention is further directed to a hydrocyclone apparatus which is comprised of an elongate tube having a peripheral wall enclosing a hollow interior, a first header end, an opposite open tail end for discharging the heavier density liquid, and a breech opening in the peripheral wall. An inlet block is provided for being received into the hollow interior of the tube through the breech opening. The inlet block includes a generally tangentially oriented inlet for swirling the fluid mixture as it is admitted into the hollow interior of the elongate tube.

The invention is also directed to a hydrocyclone apparatus which is comprised of a relatively elongate tube having a peripheral wall enclosing a hollow interior, a first open header end, an opposite open tail end for discharging the heavier density liquid, and a breech opening in the peripheral wall. An inlet block is provided for being received into the hollow interior through the breech opening. The inlet block includes a generally tangentially oriented inlet for swirling the fluid mixture as it is admitted into the hollow interior of the elongate tube. An overflow plug is provided for being received into the header end of the elongate tube to engage the inlet block and restrain the inlet block from exiting the hollow interior through the breech opening. The overflow plug is secured by screw threads in the open header end of the tube and the screw threads are oriented relative to the generally tangentially oriented inlet of the inlet block such that the drag of the fluid mixture passing through the tangential inlet causes the elongate tube to rotate in a direction which tightens the screw threads between the elongate tube and the overflow plug.

The above and other objects of the invention are accomplished by a method of assembling a hydrocyclone separator system which comprises slidably inserting the separator tubes through the open end of the pressure vessel into the hollow interior thereof through an opening in the dividing plates until the shoulder portion engages the dividing plate to limit the longitudinal movement of the tubes in a first longitudinal direction. The tubes are further inserted into the pressure vessel until all of the openings are filled with tubes. An end plate is affixed to the open end of the pressure vessel to enclose the open end of the pressure vessel and also to limit the movement of the tubes in the opposite longitudinal direction and thereby hold the tubes in assembly within the pressure vessel.

BRIEF DESCRIPTION OF THE DRAWINGS

Some of the objects of the invention have been stated and others will become apparent as the description proceeds as taken in connection with the accompanying drawings in which.

DETAILED DESCRIPTION OF THE PREFERRED EMBODIMENT

As will be discussed throughout the following pages, the illustrated embodiment of the hydrocyclone apparatus is directed to de-oiling a fluid mixture containing primarily water with a small portion of oil therein. The invention, however, is not limited to de-oiling water, but rather has applications for dewatering oil/water mixtures and separating fluid mixtures not including oil or water or both. As it has now been clearly stated that the invention has broader application than the illustrated apparatus, the description of the preferred embodiment will proceed recognizing that such broader applications may require modifications of the preferred embodiment in a manner that are within the skill of a person having ordinary skill in the art.

Figure 1:
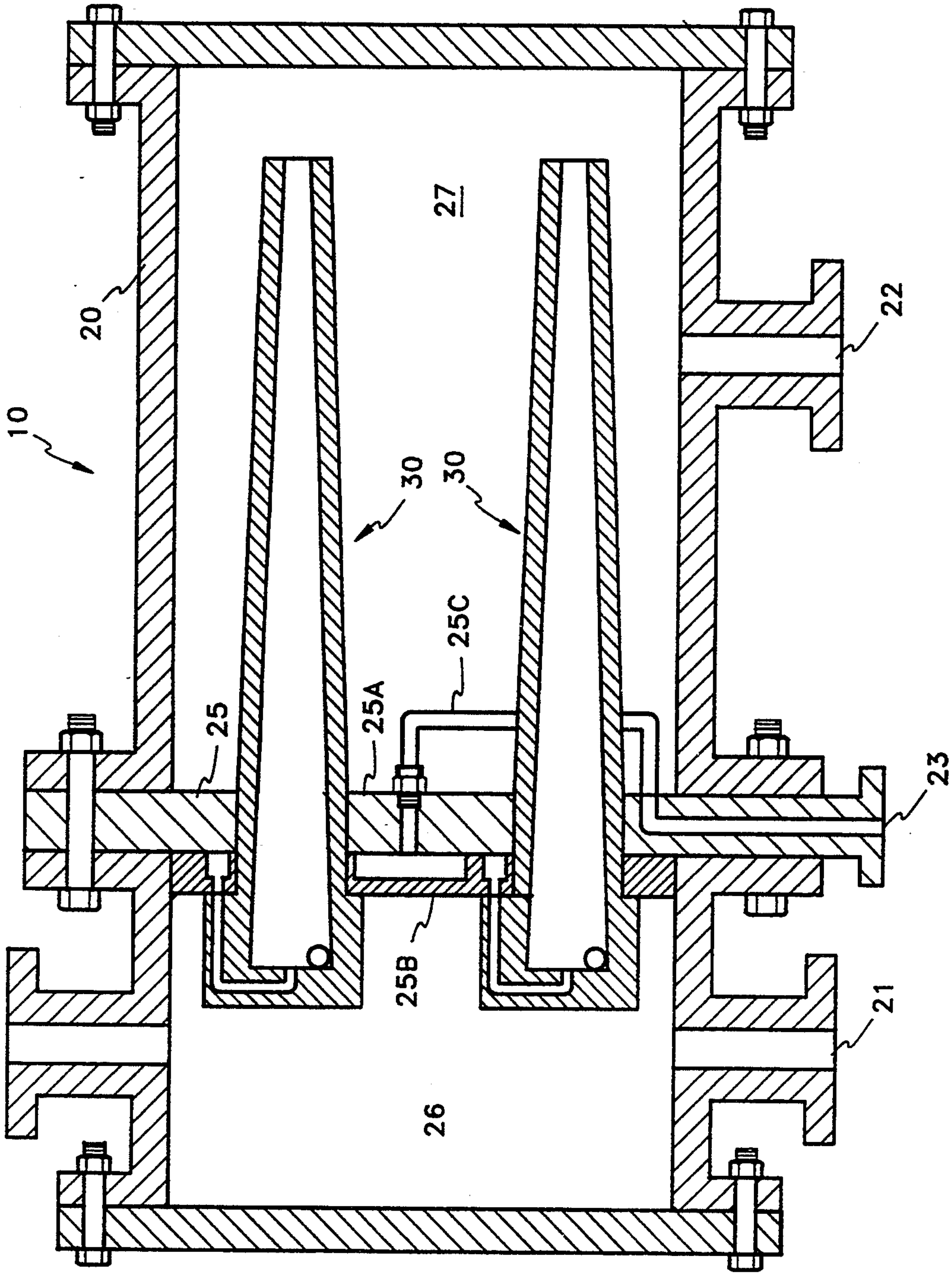
PRIOR ART Fig. 1
FIG. 1 is a cross sectional view of a prior art hydrocyclone vessel with the liners therein.
Figure 2:
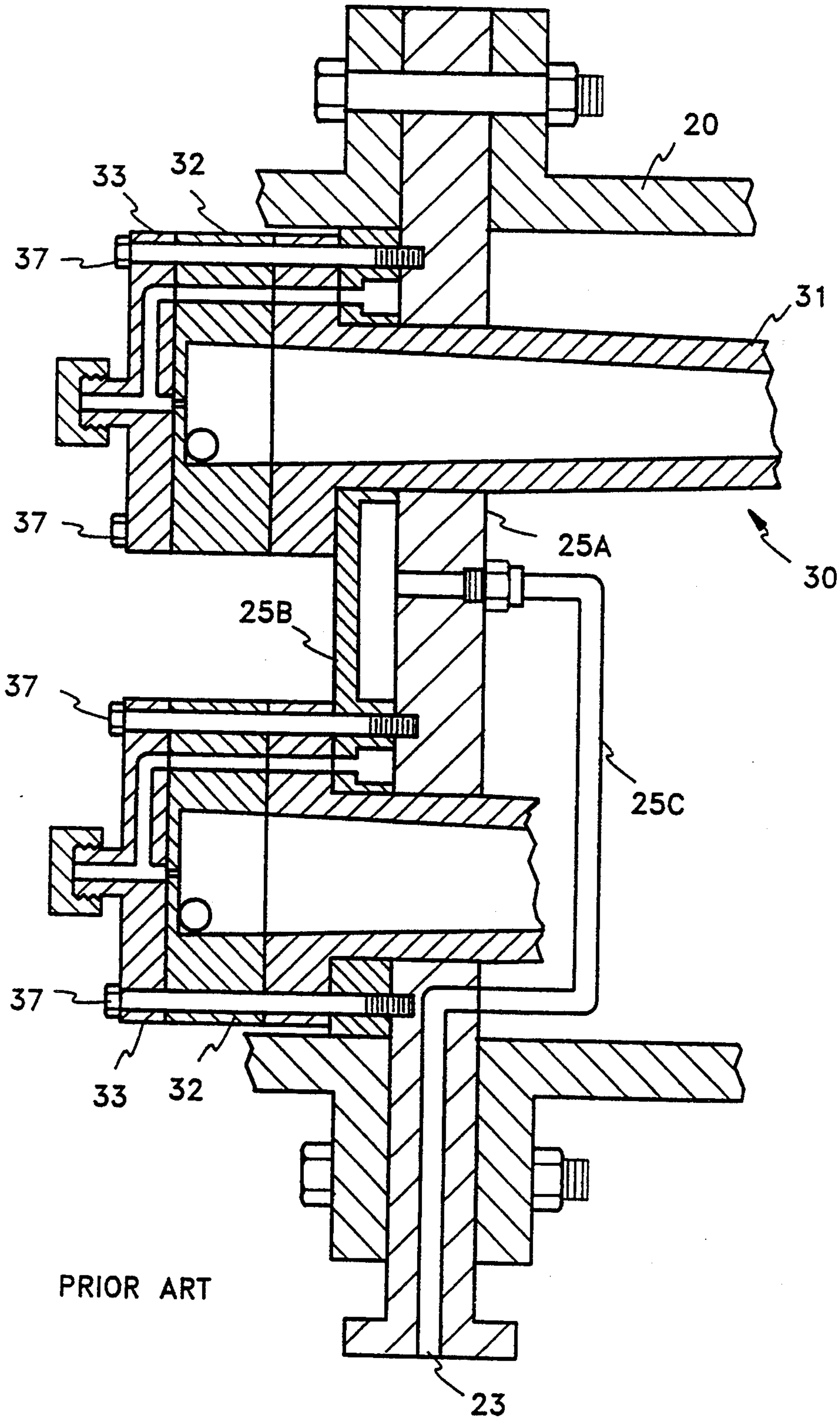
FIG. 2 is an enlarged cross sectional fragmentary view of the head portions of the hydrocyclone liners illustrated in FIG. 1.
Figure 3:
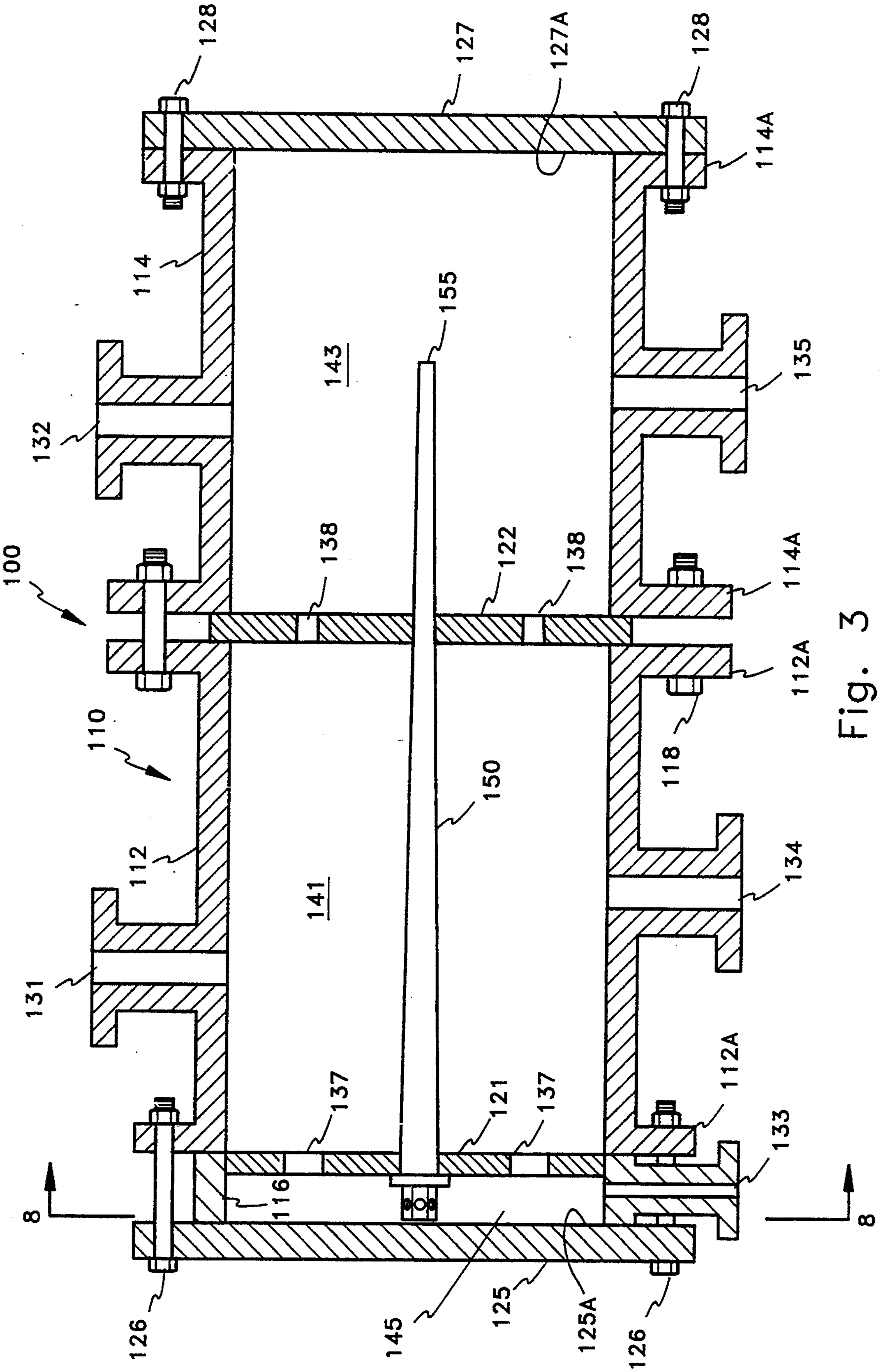
FIG. 3 is a cross sectional view of a hydrocyclone apparatus similar to FIG. 1 embodying the features of the instant invention.

Referring now more particularly to FIG. 3, a preferred embodiment of a hydrocyclone apparatus is generally indicated by the number 100 which includes the features of the present invention. The hydrocyclone apparatus 100 comprises a generally cylindrical hollow pressure vessel 110 which is preferably an assembly of elements and components. The central components are a pair of open ended hollow first and second sleeve sections 112 and 114, sometimes referred to as spool sections, having flange portions 112A and 114A extending radially outwardly at the ends thereof. The first and second sleeve sections 112 and 114 are attached together by bolts 118. A third open ended hollow sleeve section 116 is attached to the free end of the first hollow sleeve section 112 by bolts (not shown). As illustrated, the third sleeve section 116 has a shorter length dimension than the first and second sections 112 and 114 which is suitable for the small volumes of oil discharged in a de-oiling system. However, in a dewatering, dehydration or pre-separation hydrocyclone, the third section may have to be larger to accommodate the larger volumes of oil as will be described in more detail below. The open end 125A of the vessel 110 at the left side of the drawing is closed by an end cap 125 which is secured by bolts 126 and the opposite open end 127A is closed by a second end cap 127 which is secured by bolts 128. Alternatively, the second section 114 may be manufactured with a closed end avoiding the need for a second end cap 127. The aforementioned sections 112, 114, and 116 and end caps 125 and 127 form a generally closed pressure tight vessel 110 which is able to withstand significantly high pressure. Accordingly, suitable seals and gaskets (not shown) are provided between the various connected parts. Moreover, the sections 112, 114, 116 and end caps 125, and 127 are made of high strength material such as steel and provided with a substantial thickness dimension to withstand the high pressure to which the vessel will be subjected.

Within the generally closed vessel 110 are positioned two dividing plates to divide the space into three chambers. A first dividing plate 121 is positioned generally at the juncture of the first hollow section 112 and the third section 116. The second dividing plate 122 is generally positioned at the juncture of the first and second sections 112 and 114. Each of the dividing plates is therefore spaced inwardly from the ends of the vessel and oriented generally transversely across the generally cylindrical space within the vessel 110. The three chambers in the vessel 110 defined by the dividing plates 121 and 122 are a medially positioned inlet chamber 141 between the two dividing plates 121 and 122, a first end underflow discharge chamber 143, and a second end overflow discharge chamber 145. It should be noted that at least the first dividing plate 121 does not have the same thickness dimension as the sections 112, 114 and 116 and the end caps 125 and 127. As will be discussed below, the first dividing plate 121 receives support from the first end cap 125.

The vessel 110 further includes a number of ports for fluid to enter and exit the vessel. In particular, the vessel includes a first inlet port 131 in the side wall of section 112 for a fluid mixture to enter the vessel 110. The fluid is separated, as will be discussed below, into separate liquid constituents. In a de-oiling hydrocyclone such as in the illustrated embodiment, a fluid mixture of oil and water is be separated into a heavier phase underflow of substantially oil-free clean water and a lighter phase overflow fluid being a mixture of oil and water wherein the oil comprises a substantial portion of the mixture. The clean water exits through the discharge port 132 and the overflow fluid is discharged through overflow port 133. The remaining ports 134 and 135 are drainage ports which may be provided with valves which are opened to drain the vessel for maintenance. The ports 131, 132, and 133 are also provided with suitable valves as necessary to control the operation of the hydrocyclone apparatus 100.

The dividing plates 121 and 122 include a plurality of openings 137 and 138, respectively, for mounting liners 150 to extend longitudinally in the vessel 110. As illustrated, the openings 137 are larger than the openings 138. This is due in part to the tapered or reducing diameter of the liners 150 and also to make it easier to install and remove the liners 150 from the vessel 110. The liners 150 are installed and removed, as will be further described below, through the open end 125A of the vessel 110 with the end cap 125 removed. The openings 137 and 138 are generally axially aligned so that when the liners 150 are provided therein, they are generally parallel to the vessel 110. Although the embodiment is illustrated in FIG. 3 with only one liner 150 and a number of unfilled openings 137 and 138, this is for clarity and illustration purposes only. Actually, all of the openings 137 and 138 would be filled with a liner 150 or filled with a "blank" or nonfunctional liner or plugged by other means. Moreover, the liners 150 are packed as tightly into the vessel as possible and practical. The denser the packing, the greater the capacity of the hydrocyclone apparatus 100.

Figure 4:
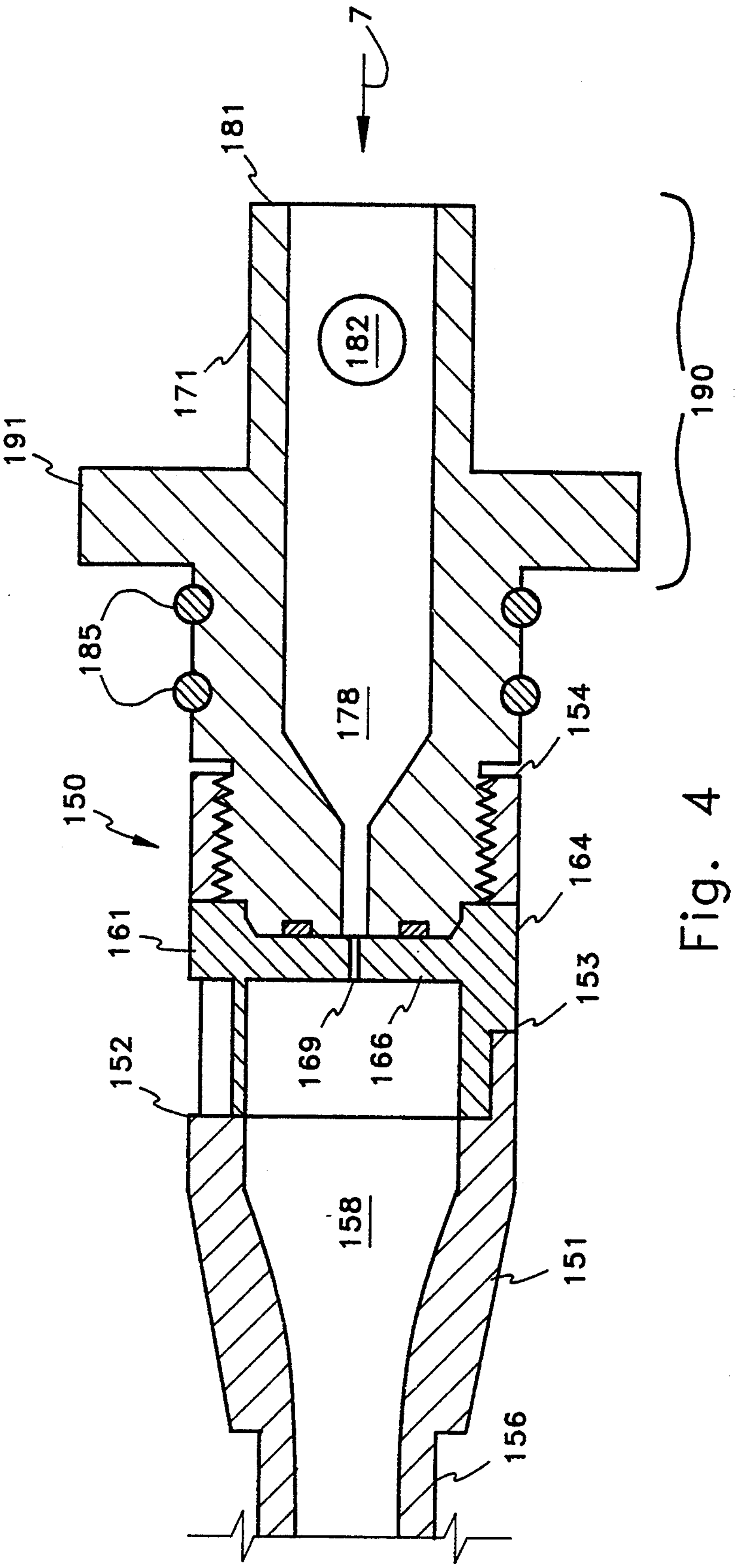
FIG. 4 is an enlarged fragmentary cross sectional view of the head portion of the liner illustrated in FIG. 3.
Figure 5:
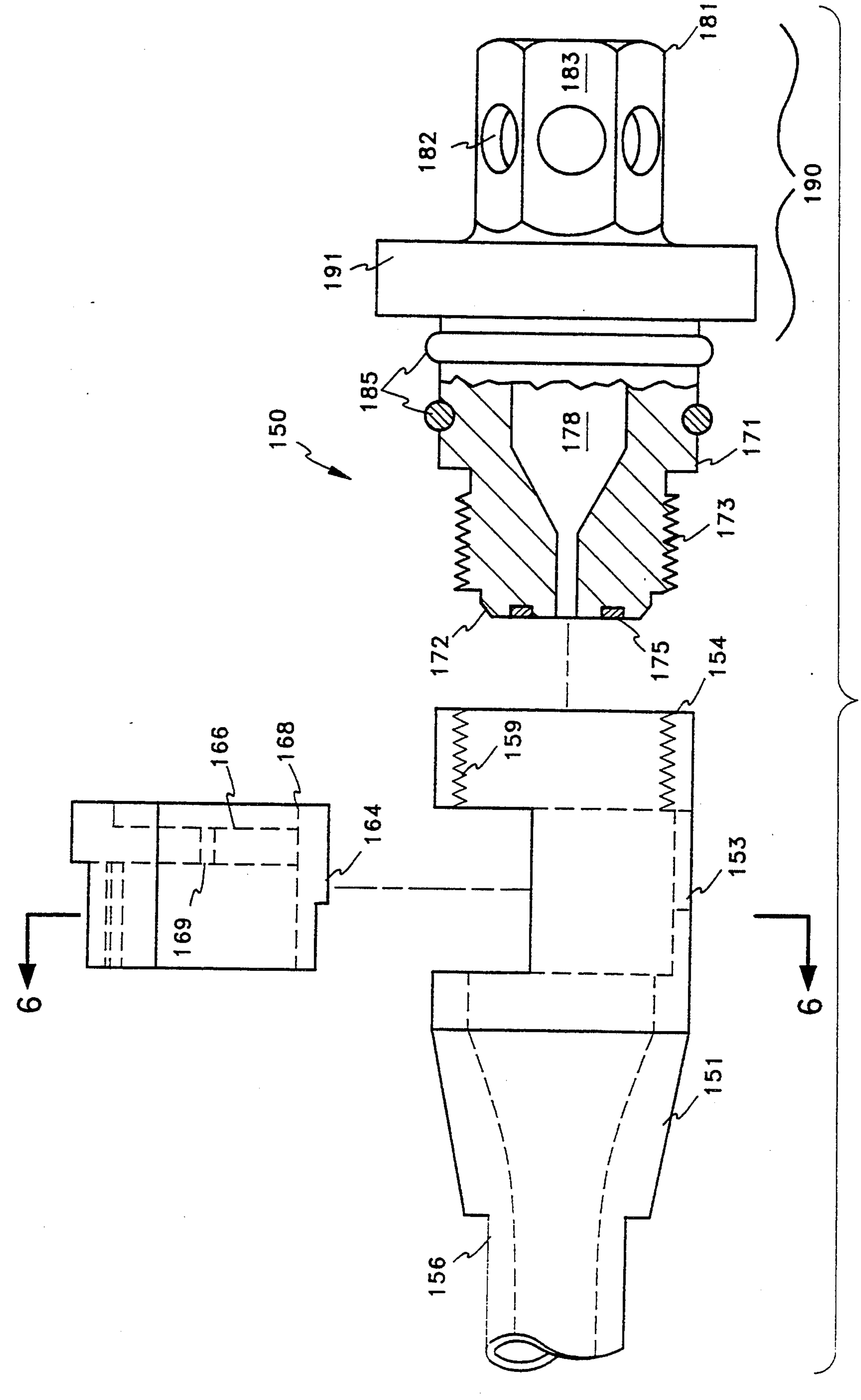
FIG. 5 is an exploded view of the liner illustrating the assembly thereof.

The liners 150 are more particularly illustrated in FIGS. 4–7 and referring now to FIGS. 4, 5, *6a* and *6b*, the liner 150 may be seen to be an assembly. The liner 150 comprises an elongate tube 151 having opposite open ends 154 and 155 (FIG. 3) and made of stainless steel, plastic or other suitable material. The first open end 154 is sometimes referred to as the header end and is somewhat larger in diameter than the opposite open end 155 which is referred to as the tail end. The tube 151 has a peripheral wall defining a hollow interior space 158 having a predetermined interior contour which reduces in diameter from the header end 154 to the tail end 155. Portions of the hollow interior space may be tapered or generally cylindrical or curved as desired or as determined for the particular application of the hydrocyclone apparatus 100.

Near the header end 154 of the tube 151 is a breech opening 152 in the peripheral wall thereof for inserting an inlet block 161 into the tube 151. The inlet block 161 is inserted into the tube 151 somewhat like a breech loaded cartridge for a rifle, hence the name "breech" opening. The breech opening 152 is essentially a rectangular cut through the curved peripheral wall of the tube 151 spanning almost the entire diameter at that portion of the tube 151. The inlet block 161 is configured to nest into the hollow interior of the tube 151 at the breech inlet 152 so that the outer surfaces of each are practically flush with each other presenting a generally smooth surface for the liner 150.

The inlet block 161 comprises a back wall 166 which extends transversely across the hollow interior of the tube 151, a curved top wall 163 which rests within the breech opening, and generally curved bottom and side walls 165 and 167, respectively, which nest within recesses in the peripheral wall of the tube 151. The top wall 163 includes an inlet in the form of a slot 162 which is oriented generally tangentially to the longitudinal axis of the tube 151 for swirling the fluid mixture as it enters the liner 150. The inlet slot 162 preferably has an involute shape and is sometimes called an involute inlet. The fluid mixture tends to be quite abrasive particularly at the inlet block 161 and accordingly, the inlet block 161 is made of high abrasion resistant material such as ceramics, metal alloys or certain plastics. One example of a suitable alloy is a cobalt-chromium alloy sold under the trademark Stellite. The front of the inlet block 161 is open to allow the swirling fluid to pass from the inlet block 161 toward the tail end 155 of the liner 150. The back wall 166 includes a generally axial port 169 to allow one of the liquid constituents to exit the tube 151 through the header end 154 thereof. The side walls 167 of the inlet block 161 have generally flat portions 167A which engage with flat portions of the interior of the peripheral wall of the tube 151 so the inlet block 161 cannot rotate within the tube 151.

The inlet block 161 further includes a tab 164 which extends from the bottom wall 165 thereof. The tab 164 is arranged to nest in a knock out opening 153 in the peripheral wall of the tube 151 which is generally opposite to the breech opening 152 therein. The tab 164 is sized and shaped to fit into the knock out opening 153 and provide an outer surface which is smooth with the outer surface of the tube 151. As is best illustrated in FIGS. 4 and 5, the tab 164 and knock out opening 153 are offset longitudinally from the center of the breech opening 152. This is so that when the tab 164 is nested down in the knock out opening 153, the inlet block 161 is in its proper orientation for operation. A person not fully familiar with the assembly of the hydrocyclone apparatus 100 might otherwise install the inlet block 161 so that the back wall 166 faces the tail end 155 of the tube 151 rather than the header end 154. In this backward orientation, the tab 164 would be misaligned with the knock out opening 153 and engage the recessed peripheral wall of the tube 151. The top wall 163 would therefore project outwardly from the breech opening 152 by the thickness of the tab 164. This should alert the person assembling the liner 150 that the inlet block 161 is not in its proper place. However, as will be explained below, this feature of the top wall 163 projecting out of the breech opening 152 when the inlet block 161 is oriented backwards will prevent the installation of the misassembled liner 150 into the vessel 110.

The tab 164 also serves as a knock out for maintenance personnel to use to push the inlet block 161 out of the tube 151. After extensive use, it is expected that the liner 150 would collect a lot of sediment and scale in the gaps and joints such that the inlet block 161 may be pretty well stuck in the interior of the tube 151. In the present invention, a simple hammer and punch could be used to knock the inlet block 161 out through the breech opening 152. Without the knock out opening 153, it is likely that a maintenance person would insert a screw driver into the generally tangential slot 162 and pry the inlet block 161 out of the tube 151 perhaps damaging or distorting the slot 162. The slot 162 is typically designed with certain precision such that any disfiguration thereof may cause reduced hydrocyclone performance and increased wear of the inlet block 161.

The liner 150 further includes a overflow plug 171 which is connected to the header end 154 of the elongate tube 151. The overflow plug 171 includes a nose portion 172 for inserting into the open header end 154 and having screw threads 173 for engaging the screw threads 159 in the tube. The nose portion 172 includes a sealing ring 175 for engaging the back wall 166 of the inlet block 161 and sealing therewith. An axial overflow gallery 178 in the overflow plug 171 is in general alignment with the axial port 169 in the inlet block 161 to receive the overflow fluid which exits through the port 169. The axial overflow gallery 178 extends to the distal end 181 of the overflow plug 171 to discharge the overflow fluid into the overflow discharge chamber 145. A plurality of holes 182 extend transversely through the overflow plug 171 near the distal end 181 which provide further outlets for the overflow fluid to be discharged from the overflow gallery 178 into the overflow discharge chamber 145.

Figure 7:
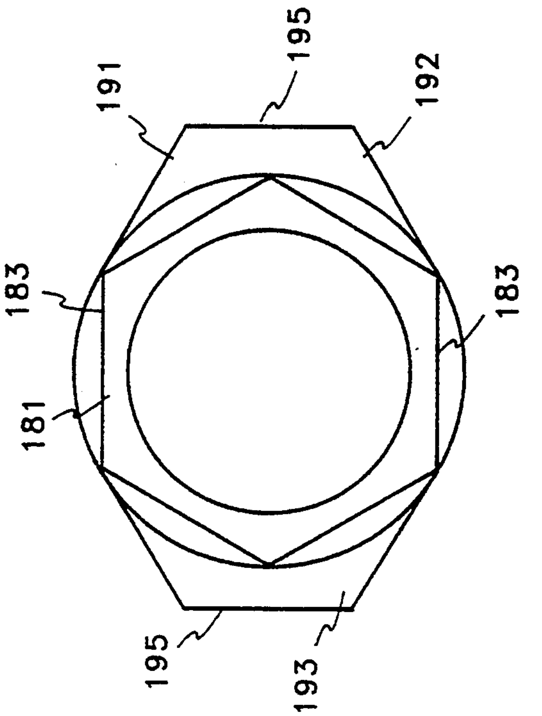
FIG. 7 is an end view taken from the viewpoint of arrow 7 in FIG. 4 of the end plug illustrating the shape of the antirotation shoulder.
Figure 6:
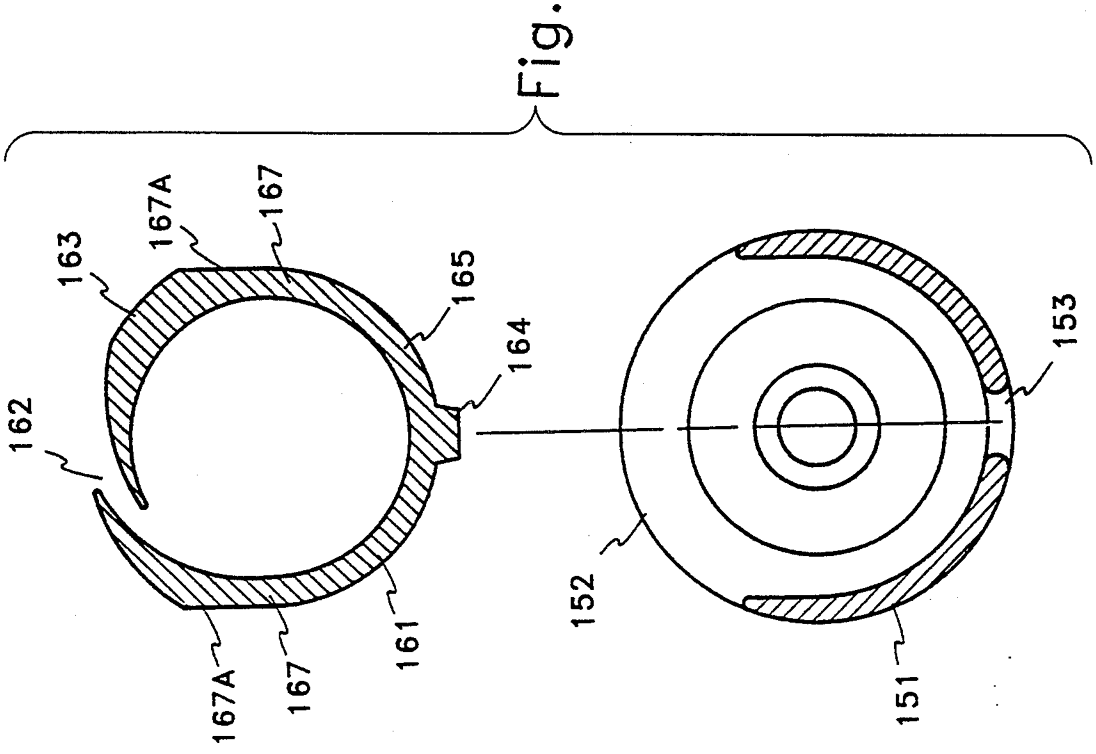
FIGS. 6*a* and 6*b* are a cross sectional exploded view of the liner taken along line 6—6 of FIG. 5.

The overflow plug 171 further includes a hexagonal portion adjacent the distal end having wrench flats 183 as best seen in FIG. 7. The elongate tube includes wrench flats 156 so that maintenance personnel may utilize the various wrench flats to tighten or unscrew the overflow plug 171 from the elongate tube 151.

The overflow plug 171 further includes a securing portion 190 by which the liner is secured in the vessel 110. The securing portion 190 comprises a shoulder portion 191 and extends to and includes the distal end 181 of the overflow plug 171. The shoulder portion 191 of the securing portion 190 has a diameter larger than the remainder of the liner 150 and each of the openings 137 and 138 in the dividing plates 121 and 122. Accordingly, the shoulder portion 191 abuts the dividing plate 121 at the opening 137 therein. The liners 150 are inserted and removed from the vessel 110 through the open end 125A with the end cap 125 removed. With the liners 150 fully inserted into the openings 137 and 138 such that the shoulder 191 is firmly abutted to the dividing plate 121, the distal end 181 of the overflow plug 171 is just slightly recessed from the open end 125A. Thus, when the end cap 125 is secured over the open end 125A, the distal ends 181 are in close proximity to the end cap 125. Accordingly, the securing portion 190 of the overflow plug 171 is held substantially in place between the dividing plate 121 and the end cap 125. Therefore, the liner 150 is secured in the vessel 110 by the openings 137, 138 and by the dividing plate 121 and the end cap 125.

Adjacent the shoulder portion 191 along the outer surface of the overflow plug 171 are a pair of o-rings 185 which are nested into radial grooves on the periphery of the overflow plug 171. The o-rings 185 seal the openings 137 in the first dividing plate 121 around each liner 150 so that the medial inlet chamber 141 is sealed from the first end overflow chamber 145 and that the only way that chambers 141 and 145 may communicate are through the liner 150. The liner 150 further includes similar radial grooves in the periphery thereof for a second pair of o-rings to seal around the liners 150 in the openings 138 in the second dividing plate 122. The second set of radial grooves are positioned nearer to the tail end 155 of the elongate tube 151 to be in alignment with the second dividing plate 122 when the shoulder portion 191 abuts the first dividing plate 121. The outer periphery of the liner 150 may preferably be built up or provided with a collar which include the radial grooves. Again, the only way for the chambers 141 and 143 to communicate is through the liners 150.

As should be clearly understood from the drawings, the liner 150 can be and should be assembled and disassembled outside of the vessel 110 without having to perform any assembly or disassembly work on the liners 150 inside the vessel 110. The liners 150 of the present invention are particularly designed to have as few parts as possible, to fit together easily, and to minimize the peripheral space needed in the vessel 110 for each liner 150. The assembly of the liners 150 comprises installing the o-rings 185 into the radial grooves by sliding the o-rings 185 over the nose portion 172 and along the overflow plug 171 until they drop into their respective grooves. The o-rings near the tail end 155 may be installed in a similar manner. The inlet block 161 is inserted into the tube 151 through the breech opening 152 so that the tab 164 nests down into the knock out opening 153. The overflow plug 171 is connected to the elongate tube 151 by inserting the nose portion 172 into the open header end 154 of the tube 151 and engaging the threads 173 with the internal threads 159. The overflow plug 171 is rotated to tighten the screw threads 159, 173 until the sealing ring 175 is firmly seated to the back wall 166 of the inlet block 161. As best seen in FIGS. 4 and 5, the back wall 166 of the inlet block 161 is recessed inwardly from the back edges of the top, back and side walls 163, 165, and 167. As such the top, back and side walls 163, 165, and 167 form an axial flange 168 for the nose portion 172 to nest therewith in when the sealing ring 175 is seated against the back wall 166. Accordingly, the inlet block 161 is not only held in place by the frictional force of the sealing ring 175, but also by mechanical engagement of the nose portion 172 with the axial flange 168. Once the screw connection for the overflow plug 171 is fully tightened the liner 150 is fully assembled and ready to be installed into the vessel 110.

Referring now to FIG. 3, the preassembled liner 150 may be installed into the vessel 110 in a very simple process. The end cap 125 is removed from the end of the vessel by removing the bolts 126. With the end of the vessel 110 now open, the liner or liners 150 may simply be inserted, tail end first, into one of the openings 137. Since the tail end 155 is smaller than the openings 137, it should be easily inserted into one of the openings 137 in the first dividing plate 121. As the liner 150 is moved farther into the vessel 110, the tail end 155 must be aligned with the opening 138 in the second dividing plate 122 which corresponds to the selected opening 138 in the first dividing plate 121. The openings 137 and 138 which correspond to one another are in general axial alignment. Finally, the shoulder portion 191 of the liner 150 abuts against the first dividing plate 121 while the o-rings become aligned with the dividing plates 121 and 122 so as to seal the respective openings 137 and 138 around the liners 150. It is expected that the o-rings may form a tight fit within the openings 137 and 138. Accordingly, it may be necessary to tap the distal end 181 of the overflow plug 171 with a rubber hammer to seat the o-ring seals and the shoulder portion 191 against the dividing plate 121. To remove a liner 150 from the vessel 110, the holes 182 near the distal end 181 of the overflow plug 171 may be used for a tool to attach to the liner 150. For example, a tool, such as a slide hammer, having a hook for attaching to the holes 182 and a handle or some mechanism by which a pulling force may be exerted on a liner 150. The tool may be helpful to maintenance personnel since it might require an initial forceful knock to overcome the tight fit of the seals and any sediment that may further resist the removal of the liner 150 from the vessel 110, so a secure grasp of the liner 150 may be necessary to remove the liner 150 from the vessel 110.

One aspect of installing and removing liners 150 from the vessel 110, as was noted above, if the tab 164 had not seated or nested in the knock opening 153, then the top wall 163 of the inlet block 161 would have projected out of the breech opening 152. As such, while installing the misassembled liner 150 into the vessel 110, the top wall 163 engages the dividing plate 121 and prevents the liner 150 from being further inserted into the openings 137 and 138. With the liner 150 stopped at the inlet block 161, the vessel 110 cannot be closed thereby preventing this type of misassembly of the apparatus 100.

Once the liners 150 are all placed into the vessel 110, the end cap 125 is replaced over the open end 125A and the bolts 126 are used to secure the vessel pressure tight. It should be noted here again that all of the openings 137 and 138 must be filled with a liner or other device to prevent the chambers 141, 143 and 145 from communicating except through the liners 150. By closing the end cap 125 over the open end of the vessel 110, the liners 150 are secured in the vessel 110 as discussed above. However, while the arrangement has secured the liners 150 from longitudinal movement in the vessel 110 by the dividing plate 121 and end cap 125, and secured the liners 150 from radial displacement by the openings 137 and 138, this mounting arrangement does not prevent the liners 150 from rotating within the openings 137 and 138.

Figure 8:
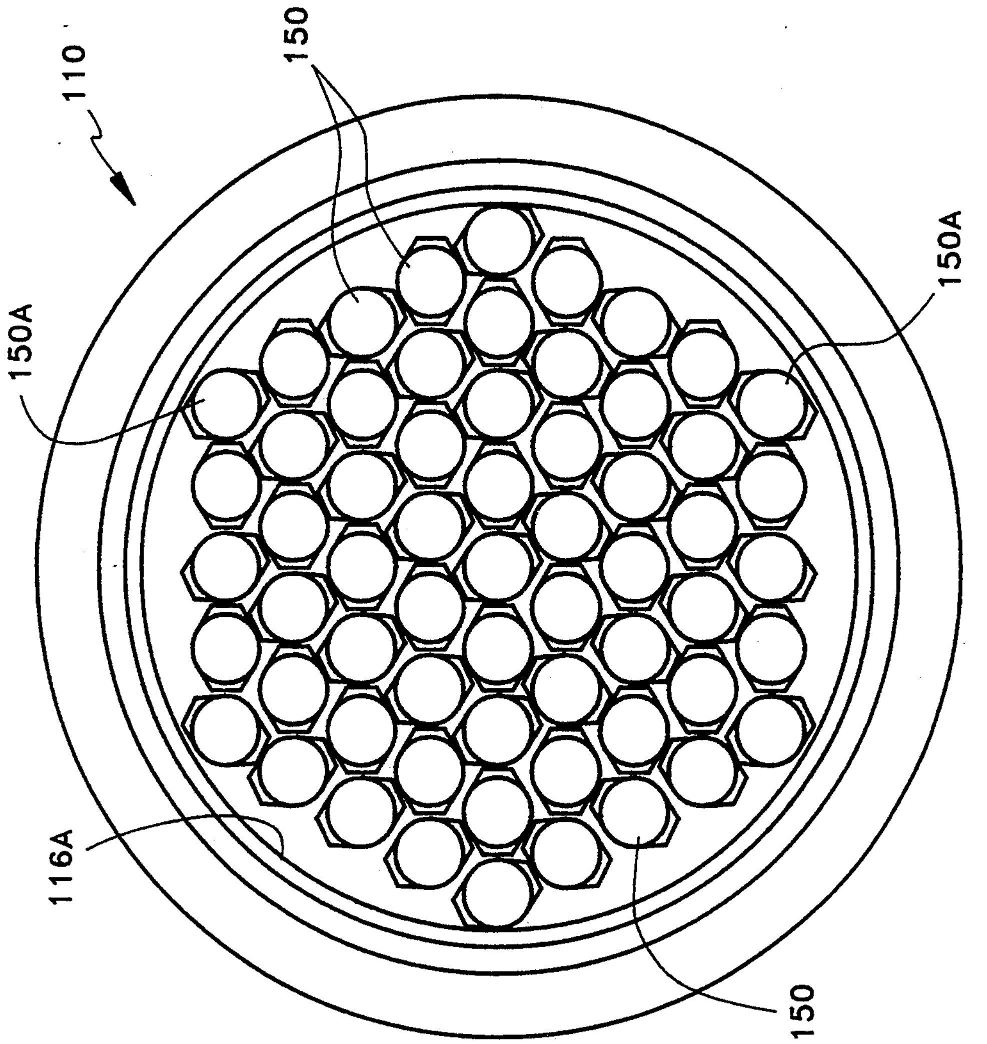
FIG. 8 is an end view of the vessel taken along the line 8—8 in FIG. 3 illustrating the density packing of the liners in the vessel.

The liners 150 have a tendency to rotate during operation of the hydrocyclone 100 because the drag of the fluid mixture entering the liner 150 through the generally tangential inlet slot 162. The rotation of the liners 150 may tend to accelerate wear of the o-rings 185, thus to limit the rotation, the shoulder 191 of the overflow plug 171 is shaped to limit or stop the rotation of the liners 150. It should be noted that preferably all of the liners are substantially identical and would be expected to rotate in the same direction. Referring now to FIGS. 7 and 8, the shoulder 191 comprises opposite lobes 192 and 193. The lobes 192 and 193 are sized and shaped to engage against the inside wall 116A of the vessel 110 or against the lobes 192 and 193 of adjacent liners 150 depending on where the liner is positioned in the vessel 110. As is best seen in FIG. 8, the liners 150 are arranged in a hexagon shape which provides the densest arrangement of the liners 150 in a cylindrical space. With the hexagon arrangement, there are six liners 150A positioned at the corners and are closest to the inside wall 116A. These corner liners 150A cannot freely rotate because the inside wall 116A interferes with the arcuate path of rotation of the lobes 192 and 193. Accordingly, the corner liners 150A will be limited from rotating by the inside wall 116A if there is not another element to block the path of the lobes 192 and 193 such as a lobe on an adjacent liner 150. With one of the lobes 192 and 193 stopped against the inside wall 116A, the other of the lobes 192 and 193 will extend outwardly blocking the arcuate path of rotation of the lobes of at least one liner 150 adjacent to the corner liner 150A. One of the lobes 192 and 193 of at least one of the adjacent liners 150 will then be stopped by the blocking lobe of the corner liner 150A. The adjacent liner 150 will then have its other lobe blocking the arcuate path of the lobes of liners 150 adjacent to the first mentioned adjacent liner 150. It should become clear that the lobes 192 and 193 of all the liners 150 in the vessel 110 eventually interlock with one another so that the liners 150 are limited from rotating in the openings 137 and 138.

The design of the shoulder portion 191 and the lobes 192 and 193 which comprise the shoulder portion 191 is an important feature of the present invention. The lobes 192 and 193 are sized, based upon a standard spacing between liners 150 in the vessel 110, such that the lobes 192 and 193 will pass adjacent liners 150 unless the adjacent liner 150 is oriented with one of the lobes 192 and 193 extending toward the passing lobe. The lobes 192 and 193 are further sized and shaped such that it avoids wedging with adjacent liners 150 or the lobes 192 and 193 of adjacent liners 150. The size and shape of the lobes 192 and 193 form a shoulder portion 191 having a square edged oval shape.

The term wedging is intended to describe the locking or fixing of two liners against one another so that significant force is required to free one from the other. One method of two liners wedging against one another in the environment of the present invention is where a first lobe on a liner contacts a lobe on an adjacent liner at a low angle of incidence and the adjacent liner is prevented from rotating in a direction that will allow the first lobe to continue rotating. The low angle of incidence is more particularly described as being where the first lobe may slide along the side of the second lobe after the contact but before sufficient resistance is experienced by the first lobe against the second lobe. Once the requisite resistance is met, the second lobe has been deflected somewhat and is then exerting a substantial restoration force, similar to the restoration force of a deflected spring, against the end of the first lobe. The restoration force causes significant frictional forces between the lobes so that neither tube may be easily rotated or pulled from the vessel. There may be other methods of adjacent liners becoming wedged by interaction of the lobes and the above method was presented only as an example. The design of the lobes 192 and 193 which avoids the problem of wedging was achieved after much consideration and experimentation and is best explained and understood in the context of the process of its development.

The design process began with the idea that the densest packing arrangement is the hexagon or honey comb arrangement. Therefore, it was originally proposed that the shoulder portions have a hexagon shape similar to the head of a bolt. A hexagon shaped shoulder portion essentially has six lobes extending outwardly in mutually opposite angles. As such, at least some of the six lobes on this proposal would extend outwardly from the corner liners 150A beyond the inside wall 116A requiring a slightly larger vessel 110 to accommodate the same number of liners 150. As noted above, the size, weight and capacity of hydrocyclones are important considerations and it was decided that two of the six lobes should be removed to minimize the size of the vessel for the desired capacity. The four remaining lobes essentially formed two opposite lobes with flat ends. It was this configuration that the wedging problem arose. To alleviate the wedging problem, the sides of each lobe 192 and 193 were tapered inwardly so that the lobes of the present invention are narrower than the flat portions of the original hexagon shape. With this stubby and narrow lobe design, one lobe of one liner will not be blocked by another lobe or wall such that the opposite lobe will be at a low angle to any other lobe. Moreover, when two adjacent lobes do contact one another, the contact is rather blunt having a high angle of incidence therebetween.

Once the lobes 192 and 193 have interlocked and limited further rotation, the force causing the rotation will serve to tighten the screw thread connection between the elongate tubes 151 and the overflow plugs 171. More particularly, the fluid mixture entering the generally tangential inlet slot 162 imposes a rotation force on the liner 150 as discussed above. With the force being imposed at the inlet slot 162 which is in the inlet block 161, the inlet block 161 must be secured from rotating. As discussed above, the inlet block 161 nests with the elongate tube 151 such that the inlet block 161 cannot rotate relative to the tube 151. However, the tube 151 is prevented from rotating by the interlocking of the lobes 192 and 193 on the overflow plug 171 and the tube 151 is connected by screw threads to the overflow plug 171. Accordingly, depending on the orientation of the screw threads to the rotation force, the screw thread connection will be urged to tighten or loosen during operation of the hydrocyclone apparatus 100. In the present invention, the screw thread connection is oriented relative to the generally tangential inlet 162 such that the screw thread connection tightens during operation of the hydrocyclone apparatus 100.

Turning now to the operation of the hydrocyclone apparatus 100, the process begins with a high pressure fluid mixture being injected through the inlet port 131 into the medial inlet chamber 141 wherein the rate of entry of the fluid mixture may be regulated by a suitable valve (not shown). As the medial inlet chamber 141 fills with the high pressure fluid mixture, the mixture enters the liners 150 through the generally tangential inlet slots 162 in the inlet blocks 161. The generally tangential orientation of the slots 162 causes the fluid mixture to swirl at a very high rate which tends to force the denser liquid constituent to the outside of the liner 150 and the lighter density liquid constituent to the inside thereof. The swirling fluid mixture moves toward the open tail end 155 as the inside diameter of the liner 150 gets smaller. Eventually, the heavier liquid constituent exits the tail end 155 of the liner 150 into the underflow discharge chamber 143 and the lighter density liquid constituents are pushed to the center or axis of the liner 150. The axial port 169 permits the lighter density fluid to pass into the axial overflow gallery 178 and from there into the overflow discharge chamber 145 and out through the overflow port 133. The heavier liquid constituent in the underflow discharge chamber 143 is conducted out through the discharge port 132 which may be controlled by a valve (not shown) so as to control the pressure drop from the inlet port 131 to the outlet port 132. In the case of oil separation from water on an offshore oil platform, the heavier liquid constituent is oil-free water and is delivered overboard. The overflow may be combined with the production stream of the other oil produced from the well.

By adjusting the valves (not shown) at each of the ports 131, 132 and 133, the pressures in the various chambers 141, 143 and 145 may be controlled so that the inlet chamber 141 is at a pressure above the pressures of the discharge chambers 143 and 145. More particularly, the inlet chamber 141 is typically operated at a substantially higher pressure than the discharge chambers 143 and 145. The discharge chambers are not necessarily operated at the same pressure wherein one may be higher than the other. Adjusting the relative pressures of the chambers may alter the ratio of overflow to the underflow. It should be noted that in a de-oiler such as the illustrated embodiment, the substantial majority of the fluid mixture is expected to be discharged through the tail end 155. In a dewatering hydrocyclone, the amount of overflow would be higher and as noted above, the overflow discharge chamber may be larger to handle the additional volume of overflow fluid. To accommodate such additional capacity the third section 116 of the vessel 110 may have additional length compared to the illustrated third section 116 and include a perforated plate therein which would be arranged to be proximate to the distal ends 181 of the overflow plugs 171. The perforated plate serves to secure the liners 150 in the vessel 110 as the end cap 125 does in the illustrated embodiment while permitting the overflow fluid to pass therethrough. The larger capacity overflow discharge chamber may also be provided with a larger discharge port 133. The dewatering hydrocyclone may further include different geometries, for example, the liners 150 may have a different relative size of the open tail end 155 to the size of the axial port 169. The geometries are more fully discussed in U.S. Pat. Nos. 4,237,006 to Colman et al. and 4,749,490 to Smyth et al.

One particular design feature related to the different pressures in the chambers is the dimension as noted above of the dividing plate 121. In particular, the first dividing plate 121 is provided with a small thickness dimension relative to the end cap 125. Since the shoulder portions 191 of the overflow plugs 171 abut the dividing plate 121 and the distal ends 181 of the overflow plugs 171 are in close proximity to the end cap 125, the dividing plate 121 is limited from deflecting toward the end cap 125. Moreover, as noted above, the pressure in the medial inlet chamber 141 is significantly higher than the pressure in the overflow discharge chamber 145 and, accordingly, the dividing plate 121 would only deflect in the direction of the end cap 125. As such, the dividing plate 121 may be made with the thinner dimension anticipating that support will come in the form of the securing portions 190 of the overflow plugs 171 bridging the gap to the high strength end cap 125. The end cap 125, by standard design must withstand all the pressure that the vessel 110 can accommodate so that the end cap 125 can clearly carry the extra load. This design strategy allows for some reduction in the weight of the hydrocyclone apparatus 100.

The foregoing description of the preferred embodiment is intended to disclose and explain the invention in clear and unambiguous terms. However, it in no way should be interpreted that the invention is limited to the preferred embodiment described herein as there are many variations and modifications that could be made which embrace the spirit of the invention. Accordingly, the scope of the invention should be determined solely from the claims that follow.

We claim:

1. A hydrocyclone apparatus for separating a fluid mixture into at least two constituent parts based on density, said apparatus comprising:

a generally cylindrical hollow pressure vessel having at least one open end, an end cap for closing said open end, first and second spaced apart dividing plates disposed generally transversely within the vessel to divide the vessel into a medial inlet chamber and two end discharge chambers;

at least one longitudinally extensive hollow liner disposed through openings in each of said dividing plates so as to be free to rotate within said opening and wherein said liner has a shoulder portion shaped to limit rotation within said openings of said dividing plates by contacting at least one of an inside wall of said vessel and a portion of another liner and further wherein said at least one liner includes a fluid inlet along a peripheral portion thereof spaced inwardly from the ends thereof to be in fluid communication with said medial inlet chamber of said pressure vessel and outlets adjacent its opposite ends to be in fluid communication with respective end discharge chambers of said vessel; and sealing means for sealing the portion of the openings around the periphery of said liner in each of said dividing plates so that the chambers are sealingly isolated from one another except through said at least one liner.

2. The hydrocyclone apparatus according to claim 1 wherein said first of said dividing plates in said pressure vessel is nearest said one open end, and further wherein said liner comprises a securing portion being larger in diameter than said opening in said first dividing plate and generally extending between said first dividing plate and said end plate thereby said end plate and said dividing plates securing said liner in said pressure vessel.

3. The hydrocyclone apparatus according to claim 1 wherein said liner comprises an elongate tube and an overflow plug attached to one end of said elongate tube, and wherein said securing portion is substantially defined by said overflow plug.

4. The hydrocyclone apparatus according to claim 1 wherein said shoulder portion comprises at least two radially extensive lobes for contacting the inside wall of said vessel and said shoulder portions of other liners.

5. The hydrocyclone apparatus according to claim 1 wherein said shoulder portion is also substantially defined by said overflow plug, and further wherein said overflow plug is attached to said elongate tube by screw threads, and wherein said elongate tube includes a generally tangential inlet for the fluid mixture to enter said hollow liner, wherein said tangential inlet is oriented so that the fluid mixture passing into and through said tangential inlet causes said tube to rotate in a direction which tightens said screw threads between said elongate tube and said overflow plug.

6. The hydrocyclone apparatus according to claim 1 wherein the shape of said shoulder portion includes at least one radially extensive lobe.

7. The hydrocyclone apparatus according to claim 4 wherein said lobes of said shoulder portion form the shape of a square edged oval.

8. The hydrocyclone apparatus according to claim 1 wherein said sealing means includes at least one groove formed into the peripheral surface of said liner adjacent each of said dividing plates, and an o-ring overlying each of said grooves so as to nest therein with a portion of said o-ring extending radially outwardly therefrom.

9. The hydrocyclone apparatus according to claim 1 wherein said liner includes a overflow plug at its head end and said overflow plug includes an axial overflow gallery for conducting the lighter density fluid from said liner wherein said overflow plug includes radial holes near the distal end for the overflow fluid to exit said axial overflow gallery.

10. The hydrocyclone apparatus according to claim 9 wherein said radial holes in said overflow plug are arranged for a tool to attach thereto for removing said liner from said vessel.

11. A hydrocyclone apparatus for separating a fluid mixture into at least two constituent parts, said apparatus comprising:

a hollow pressure vessel having a longitudinal dimension and at least one open end;

at least one dividing plate having a predetermined thickness extending across said hollow pressure vessel transversely to said longitudinal dimension;

at least one longitudinal extensive hollow liner disposed through openings in said dividing plates and having first means for abutting against said dividing plate at a portion facing to said open end of said pressure vessel and second means extending toward said open end of said pressure vessel proximate to said end of said pressure vessel proximate to said end cap for contacting said end cap upon longitudinal deflection of said dividing plate;

sealing means for sealing said openings around the periphery of said liners in said dividing plate;

end cap means for closing said open end and having a thickness greater than said predetermined thickness of said dividing plate;

wherein said first dividing plate is thinner relative to said end cap and wherein said first and second means of said liner generally supports said dividing plate from said end cap.

12. A hydrocyclone apparatus for separating a fluid mixture into at least two constituent parts based on density, said apparatus comprising:

a generally cylindrical hollow pressure vessel having two spaced apart dividing plates disposed generally transversely within the vessel to divide the vessel into a medial inlet chamber and two end discharge chambers;

at least one longitudinally extensive hollow liner disposed through openings in each of said dividing plates wherein said liner comprises an elongate tube having a peripheral wall enclosing a hollow interior, a first open header end in fluid communication with a first of said end discharge chambers, an opposite open tail end in fluid communication with the second of said end discharge chambers for discharging the heavier density liquid thereto, a breech opening in said peripheral wall, and an inlet block for being received into said hollow interior through said breech opening and having a generally tangential oriented inlet for admitting the fluid mixture into said elongate tube from said inlet chamber; and sealing means for sealing the portion of the openings around the periphery of said liner in each of said dividing plates so that the chambers are sealingly isolated from one another except through said liner.

13. A hydrocyclone apparatus for separating a fluid mixture into at least two constituent parts based on density, said apparatus comprising:

a generally cylindrical hollow pressure vessel having two spaced apart dividing plates disposed generally transversely within the vessel to divide the vessel into a medial inlet chamber and two end discharge chambers;

at least one longitudinally extensive hollow liner disposed through openings in each of said dividing plates and comprising an elongate tube and a overflow plug attached to said elongate tube at one end thereof by screw threads, wherein said elongate tube includes a fluid inlet along a peripheral portion thereof in fluid communication with said medial inlet of said vessel, and said liner includes outlets at opposite ends thereof in fluid communication with respective end discharge chambers, and wherein said overflow plug includes a shoulder portion extending radially outwardly therefrom to limit the rotation of said liner in said openings by contacting at least one of an inner wall of said vessel and a portion of another liner;

sealing means for sealing the portion of the openings around the periphery of said liner in each of said dividing plates so that the chambers are sealingly isolated from one another except through said liner; and wherein said inlet in said elongate tube is oriented so that the fluid mixture passing into and through said tangential inlet causes said tube to rotate in a direction which tightens said screw threads between said elongate tube and said overflow plug.

14. A hydrocyclone apparatus for separating a fluid mixture into at least two constituent parts based on density, said apparatus comprising:

a generally cylindrical hollow pressure vessel having a first open end and a second opposite closed end, an end cap for closing said first open end, a first dividing plate spaced inwardly from said first open end of said vessel and a second dividing plate between said first plate and said second end, said dividing plates both being disposed generally transversely within said vessel to define an inlet chamber between said dividing plates a discharge chamber between said second plate and said second end and a overflow chamber between said first plate and said first end;

at least one longitudinally extensive hollow liner having a hollow interior space that generally reduces in diameter from one end to the other, a header end at the larger diameter end, an opposite tail end at the smaller diameter end, a fluid inlet along a peripheral portion thereof spaced inwardly from said ends thereof, an outlet adjacent said tail end and a overflow outlet adjacent said header end, where said liner is disposed through generally axially aligned openings in each of said dividing plates so that the tail end of said liner is within said discharge chamber, said fluid inlet is in said inlet chamber, and said overflow outlet is within said overflow chamber; and sealing means for sealing the portion of the openings around the periphery of said liner in each of said dividing plates so that the chambers are sealingly isolated from one another except through said liner.

15. The hydrocyclone apparatus according to claim 14 wherein said liner comprises an elongate tube and a overflow plug attached to said elongate tube at one end thereof, and wherein said overflow plug has a securing portion being larger in diameter than said opening in said first dividing plate and generally extending between said first dividing plate and said end plate such that said end plate prevents said liner from withdrawing from said openings in said dividing plates to thereby securing said liner in said pressure vessel.

16. The hydrocyclone apparatus according to claim 15 wherein said liner is free to rotate in said openings except for said securing portion on said overflow plug which has a shape to limit rotation of said liner by contacting one of the inside wall of said vessel and said securing portions of other liners in the vessel.

17. The hydrocyclone apparatus according to claim 16 wherein said securing portion includes a shoulder portion adjacent said first dividing plate which extends radially outwardly from the remainder of said securing portion, and wherein the shape of the shoulder portion limits rotation of said liner, wherein said shoulder portion includes at least two opposite radially outwardly directed lobes defining a square edged oval shape.

18. The hydrocyclone apparatus according to claim 14 wherein said liner includes a overflow plug at its head end and said overflow plug includes an axial channel for conducting the lighter density fluid in said liner into said discharge chamber wherein said overflow plug includes radial holes near a distal end thereof for the overflow fluid to exit the axial channel, and wherein said radial holes in said overflow plug are arranged for receiving and connecting to a tool for removing said liner from said vessel.

19. A hydrocyclone apparatus for separating a fluid mixture into at least two constituent parts based on density, said apparatus comprising:

a generally cylindrical hollow pressure vessel having a inlet port for the fluid mixture and outlet ports for each of the separated constituents;

dividing plate means having a plurality of openings therein and being disposed generally transversely within said pressure vessel to divide said vessel into at least two separate chambers;

a longitudinally extensive liner disposed in each of said plurality of openings in said dividing plate wherein at least a portion of said liners have a generally tangential inlet into a hollow interior and outlets at generally opposite ends thereof for discharging the separated constituents and an overflow plug having a radially extensive portion at one end thereof for axially abutting said dividing plate;

sealing means for sealing the portion of the openings around the periphery of said liners in said dividing plate means so that the chambers are sealingly isolated from one another except through said liner;

an end cap for closing an end of said vessel which overlies and is proximately spaced for the distal end of said overflow plug so as to secure said overflow plug between said dividing plate and said end cap; and means for limiting said liners from rotating in said openings.

20. The hydrocyclone apparatus according to claim 19 wherein said means for limiting said liners from rotating comprises a portion generally at one end having at least one radially extensive lobe for contacting the inside wall of said vessel or lobes of other liners.

21. The hydrocyclone apparatus according to claim 19 wherein said shoulder portions are shaped to stop rotation of said liners by contacting at least one of the inside wall of said vessel and said shoulder portions of other liners.

22. The hydrocyclone apparatus according to claim 21 wherein said shoulder portions have at least one radially extensive lobe.

23. The hydrocyclone apparatus according to claim 21 wherein said shoulder portions have at least two opposite radially extensive lobes.

24. The hydrocyclone apparatus according to claim 21 wherein said shoulder portions have a square edged oval shape.

25. The hydrocyclone apparatus according to claim 24 wherein the square edged oval shape is sized so that the lobes block or pass adjacent shoulder portions but do not wedge against an adjacent shoulder portion.

26. The hydrocyclone apparatus according to claim 19 wherein said end cap has a greater thickness and strength than said dividing plate means and wherein said overflow plug contacts said end cap as said dividing plate means deflects under the stress of the pressure in the inlet chamber whereby the overflow plugs support the dividing plate and limit its deflection by supporting the dividing wall means away from the end cap.

27. A hydrocyclone apparatus for separating a fluid mixture into at least two constituent parts based on density, said apparatus comprising:

a generally cylindrical hollow pressure vessel having a first open end and a second opposite closed end, an end cap for closing said first open end, at least one dividing plate spaced inwardly from said first open end of said vessel between said first open end and said second end, said dividing plate being disposed generally transversely within said vessel to define separate chambers within said pressure vessel;

a plurality of longitudinally extensive hollow liners having a header end, an opposite tail end, a fluid inlet along a peripheral portion thereof spaced inwardly from said ends thereof, an outlet adjacent said tail end and a overflow outlet adjacent said header end, where said liners are disposed through openings in said dividing plate so that the tail end of each said liner is within one chamber, and said overflow outlet is within another chamber;

sealing means for sealing the portion of the openings around the periphery of said liner in said dividing plate so that the chambers are sealingly isolated from one another except through said liner; and engagement means on said header end of each of said liners to engage one another to prevent rotation of said liners which would otherwise be rotatable within said openings.

28. In a hydrocyclone separation system having a multiplicity of elongate hydrocyclone separator tubes arranged within the hollow interior of an elongate pressure vessel open on one end, means for permitting convenient insertion and removal of said separator tubes from said pressure vessel, which means comprises:

at least one dividing plate transversely disposed in said pressure vessel to divide said pressure vessel into chamber portions;

means forming openings through said dividing plate for slidably receiving said elongate separator tubes;

shoulder means on said tubes for engaging one of said at least one dividing plate to limit relative movement of said tubular member in one direction through said opening, means for enclosing the open end of said pressure vessel and arranged for engaging one end of said elongated separator tube to limit relative movement of said tubular member in the other direction through said opening; and sealing means between said elongated tubular member and said opening to prevent fluid communication between said chamber portions.

* * * * *